United States Patent Office 3,415,926

Patented Dec. 10, 1968

1

3,415,926
EQUINE ENCEPHALOMYELITIS VACCINE

Merlin B. Hays and James C. Trace, Fort Dodge, Iowa, assignors to American Home Products Corporation, New York, N.Y., a corporation of Delaware No Drawing. Filed Mar. 9, 1966, Ser. No. 532,851
10 Claims. (Cl. 424—89)

This invention relates to compositions of matter classified in the art of medicine as killed virus vaccines and to processes of making and using such compositions. More particularly, it relates to vaccines for protection of mammals, especially horses, against equine encephalomyelitis, and to methods of preparing and using such vaccines.

The invention sought to be patented, in its composition aspect, is described as residing in the concept of an injectable vaccine comprising inactivated or killed viruses of particularly antigenic strains of Eastern and/or Western types of equine encephalomyelitis.

The invention sought to be patented, in one of its chief process aspects, is described as residing in the concept of modifying the viruses of Eastern and Western types of equine encephalomyelitis by alternating passages through guinea pigs and embryonated eggs to produce seed virus of improved antigenic properties, causing said seed viruses to be replicated separately in tissue-cultured cells of avian embryo origin in the presence of preferably serum-free maintenance medium, chemically inactivating the virus so produced, and preparing therefrom a vaccine.

At least two principal types of equine encephalomyelitis are recognized, these being usually designated as the Eastern and Western types. Both now occur in most sections of the U.S., affecting both humans and livestock, and result in very considerable losses each year.

It has already been proposed to make protective vaccines from formalin-treated brain tissue of horses infected with virulent equine encephalomyelitis virus or from formalin-treated embryonated eggs infected with virulent virus, and vaccines so prepared have been used for some years. They have, however, suffered from serious disadvantages and shortcomings, and have not attained general acceptance as satisfactory.

These prior art vaccines have contained high concentrations of extraneous protein which has tended to increase the incidence both of anaphylactic shock and untoward local reactions. Furthermore, the very fact that they contained these high protein concentrations has required the use of high concentrations of formalin to inactive the virus, and this tends to reduce the antigenicity of the resulting vaccine. Additionally, in the preparation of such vaccines, it has been necessary to clarify the products by high-speed centrifugation which tends to reduce antigenicity by removing much of the tissue-bound viral antigen.

A further reason that the previously available vaccines were unsatisfactory may be that virus strains of low antigenicity were used. As is well-known, virulence and antigenicity are not always proportional to each other, and the production of satisfactory virus vaccines requires that the viruses from which they are made be highly antigenic, so that they will effectively stimulate the production of immunizing antibodies. We have discovered a process of producing a highly effective vaccine which includes modification of the virus strains by a relatively simple procedure so as to increase the antigenic properties of the resulting vaccine.

In the process of the present invention, interposition of one or more guinea pig passages into a series of embryonated egg passages of virus results in a seed virus capable of producing vaccines of very high antigenicity. In preparing seed virus of Eastern type equine encephalomyelitis, several such alternating passages followed by several (preferably at least three) chick embryo tissue culture passages are employed; for preparing seed virus for use in production of Western type vaccine, a single guinea pig passage interposed into a series of four embryonated egg passages and followed by about four or five chick embryo tissue culture passages is employed.

2

According to the present invention, the equine encephalomyelitis virus vaccines are produced by allowing virus to be produced by growth in in vitro tissue-cultured chick embryo cells in the substantial absence of other protein materials, so that the resulting vaccines contain a minimum of extraneous material. As a result, low concentrations of formalin may be used for inactivation, which also results in higher antigenicity and immunizing ability for the vaccine. By the methods of this invention we can make monovalent vaccines for either the Eastern or the Western strains of equine encephalomyelitis as well as a bivalent vaccine capable of providing simultaneous protection against both.

In the propagation of equine encephalomyelitis virus (Eastern or Western type) primary or subsequent generations of cell cultures derived from 10 to 12 day old decapitated chick embryos are employed. The chick embryo cell cultures may be propagated in any of several tissue culture media such as the following:

(1)

| | Percent |
|---|---|
| Earle's balanced salt solution | 97.5 |
| Lactalbumin hydrolysate | 0.5 |
| Calf, lamb, chick, or turkey serum | 2.0 |

(2)

| | |
|---|---|
| Hank's balanced salt solution | 97.5 |
| Lactalbumin hydrolysate | 0.5 |
| Calf, lamb, chick, or turkey serum | 2.0 |

(3)

| | |
|---|---|
| Parker's medium 199 | 97.5 |
| Lactalbumin hydrolysate | 0.5 |
| Calf, lamb, chick, or turkey serum | 2.0 |

(4)

| | |
|---|---|
| Parker's medium 199 | 99.5 |
| Lactalbumin hydrolysate | 0.5 |

(5)

| | |
|---|---|
| Parker's medium 199 | 100.0 |

Antibiotics, preferably penicillin G, dihydrostreptomycin, and amphotericin B are added to the nutrient solutions to concentrations of 200$\mu$, 200 mcgm., and 2 mcgm., respectively. Other antibiotics or combinations of antibiotics may be used instead, the only essential requirement being that they should inhibit growth of undesired organisms without interference with the growth of the tissue cultured embryo cells or present toxicity problems when injected into mammals. pH of the medium is adjusted to 7.2–7.6 by addition of 10% sodium bicarbonate solution.

In the practise of this invention, tissue-cultured chick embryo cells are produced in general conformity with the well known tissue culture techniques of Dulbecco and Vogt, which involve the incubation of trypsin-dispersed cells of embryo tissues in nutrient fluid tissue culture media until a confluent sheet of cells is formed.

Sheets of chick embryo cells are prepared by growth in a number of Roux flasks using about 100 ml. of nutrient medium, preferably No. 1 (calf serum), with antibiotic in each flask. For production of larger batches, 4-liter "vitetx" bottles containing about 250–300 ml. of medium may be used. After a confluent sheet of cells is formed, usually in 24–48 hours, the fluid medium is discarded and the cell sheets rinsed with maintenance medium and then infected with about 5 cc. of a $10^{-3}$ dilution of equine encephalomyelitis virus (Eastern or Western type). After allowing 30 minutes for adsorption of the virus, an equal volume of maintenance medium (No. 4 or No. 5, above) containing antibiotics is added to each flask. After 24–48 hours of incubation at 35–37.5° C., the cells show the typical cytopathogenic changes characteristic of encephalomyelitis virus multiplication. Fluids only or fluids and cells are then harvested and pooled. A sample of the harvested material is taken for virus titration and sterility testing.

As an alternative procedure, we have found that it is possible to grow either the Eastern or Western type of virus in satisfactory titer in suspended cell cultures. In this method, trypsinized chick embryo cells (primary or subsequent generations) are suspended in a concentration of at least $5 \times 10^6$ cells/ml. in medium No. 3. The pH of the culture is adjusted and maintained at a pH of 7.2 to 7.6 during the virus growth period (by periodic additions of small amounts of 5–10% sodium bicarbonate solution.) Infection is accomplished when the cell culture is planted by incorporating the seed virus into the growth medium so that the final dilution of seed virus is $10^{-3}$ to $10^{-4}$. The cells are held in suspension by means of a mechanical stirrer, i.e., a magnetic stirring bar or rotary shaker. After incubation for 24–48 hours at 35–37.5° C., the virus-containing fluid and cells are harvested.

We have observed that after adaptation to the chick embryo tisue culture cells by 1–5 pasages in such cells, our modified strain of Eastern equine encephalomyelitis virus yields maximum virus in 24–48 hours by either of the above described methods. Virus concentrations usually obtained are from $10^6$–$10^8$ $LD_{50}$ (mouse) per 0.03 cc. of crude tissue culture fluid. Our modified strain of Western equine encephalomyelitis virus also yields maximum virus titers in 24–48 hours in either of the above culture systems; we usually obtain from $10^5$ to $10^7$ $LD_{50}$ (mouse) per 0.03 cc. of crude tissue culture fluid.

Inactivation of both types of the virus obtained from either of the two chick embryo tissue culture cell systems is accomplished by the slow addition, with agitation, of sufficient reagent grade formaline solution as to bring the final formalin concentration to 0.05% formalin by volume. The mixture is held at 24–28° C. for 96 hours and at 4° C. for an additional 240 hours, after which all subsequent handling and storage should be at 4° C. or less, to limit deterioration of these very heat-labile antigens. Complete inactivation of the virus is demonstrated by injection of 0.03 cc. of the formalin treated stock virus intracerebally into each of five 18–20 gram mice and observing them for 10 days, during which time they exhibit no symptoms indicative of virus infection.

Experience with equine encephalomyelitis vaccines (both Eastern and Western types) has indicated that twice the dosage giving adequate guinea pig protection is satisfactory as a horse-protective dosage. We have found that for preparing vaccines for use by giving horses two 1 ml. intradermal inoculations about two or three weeks apart, it is satisfactory to have in the vaccine killed viruses at a concentration such that, had the viruses not been killed, they would have titered about $10^{5.2}$ mouse $LD_{50}$'s/0.03 ml. for the Eastern type and about $10^{4.3}$ mouse $LD_{50}$'s/0.03 ml. for the Western type. Since the incidence of untoward reactions to our vaccines has proven to be exceedingly low, due probably to the virtual absence of protein materials other than the antigenic material itself, it is practical to employ concentrations of from ten to one hundred times higher than these levels, which permits better field results and longer storage of vaccine before use.

In the preparation of monovalent vaccines, several lots of inactivated crude virus stock of the desired type are pooled and clarified by low speed centrifugation, passage through a coarse Millipore filter pad, or a 100-mesh nylon bag.

In the preparation of bivalent vaccine, several lots of inactivated crude virus stock of both Eastern and Western types are pooled in proper proportion, dependent upon preliminary titer of the virus stock prior to inactivation. As above indicated, each ml. of final vaccine will preferably contain killed virus from at least $10^{6.7}$ mouse median lethal doses of Eastern type virus and/or at least $10^{5.8}$ mouse median lethal doses of Western type virus. It is to be noted that with the virus strains used in our vaccine, from about five to fifteen times as many mouse median lethal doses of Eastern type virus as of Western type are desirable for immunizing horses against the two diseases. This is in no way surprising, and is merely indicative of our Western strain's having a higher ratio of mouse virulence to guinea pig and horse protection than does our Eastern strain. Satisfactory vaccines are usually prepared by combining equal parts of the two types. The combined stock virus is then subjected to final clarification as in the case of monovalent vaccines.

Vaccines prepared by the processes of this invention meet the tests prescribed for equine encephalomyelitis vaccines prescribed by the U.S. Department of Agriculture for such products. These tests are designed to determine and demonstrate sterility, safety, and potency. Sterility tests on each batch are conducted according to the P–15 Standard Sterility Test Procedure for Veterinary Biological Products (United States Department of Agriculture, Apr. 5, 1960). Such test is required to show a product to be sterile in order for it to be marketable.

The safety test requires that inactivated virus from each batch be injected (0.1 cc.) into each of at least two guinea pigs. The test is considered passed satisfactorily if all guinea pigs survive 10 days or more without exhibiting symptoms of encephalomyelitis.

The potency test requires that each of 10 healthy guinea pigs receive two subcutaneous injections at 7 day intervals each of not more than ½ the recommended field dose of product and challenged 10–14 days following the second dose of vaccine. Challenge virus is, of course, of the same type (Eastern, Western, or both) as the vaccine, but is required to be of a different strain. Each vaccinated test animal and at least 4 control animals are challenged by an intracerebral injection of 0.1 ml. of a virus suspension sufficiently virulent to cause the controls to succumb within 10 days. A vaccine is considered of satisfactory potency when 8 of 10 vaccinated guinea pigs survive for at least 10 days and all controls succumb within the same period; in the event that one vaccinated pig dies from extraneous causes during the pre-challenge test period, at least 7 of the 9 remaining vaccinates must survive during the post-challenge period.

The antigenicity of the vaccines of this invention as above described may be further increased by combining them with certain adjuvant materials, among which may be mentioned alum, aluminum hydroxide, zinc hydroxide, and oil emulsions. However, even without any such adjuvant, the vaccines are highly effective in stimulating production of immunizing antibodies when injected intradermally into horses.

In order to enable others skilled in the art to prepare the vaccines of our invention, the following detailed descriptions of their preparation are given.

Preparation of equine encephalomyelitis
(Eastern type) seed virus

Starting material was the WRPF6 strain of virus, obtained from the Walter Reed Hospital as a 10% suspension of infected egg material. This material was diluted 1:1000 with buffered saline, and 0.2 cc. portions of this dilution were inoculated into 10-day embryonated eggs, which were thereupon incubated at 37° C. Twenty-four hours later the eggs were beginning to die and they were chilled in the cooler (at 4° C.) for three hours, after which the embryos were harvested. They were homogenized in buffered saline to a 10% suspension and frozen. A portion of this suspension was thawed, diluted 1:100,000 with buffered saline, and inoculated again into 10-day embryonated eggs; after incubation at 37° C. for 24 hours, the embryos were harvested, homogenized as before. This was repeated twice more, for a total of four consecutive egg passages. A 10% suspension of the 4th egg passage material was contrifuged at 1500 r.p.m. for 10 minutes to remove tissue fragments and then diluted 1:100; 0.1 cc. of this was injected intracerebrally into each of 2 guinea pigs. The guinea pigs became paralyzed after 72 hours and were sacrificed. Their brains were ground in buffered saline to form a 50% suspension, which was then spun at 2000 r.p.m. for 10 minutes. The supernatant liquid was diluted 1:50 with buffered saline and inoculated into 10-day embryonated eggs, 0.2 cc./egg. Eggs were harvested after one day, and the alternating passage through guinea pigs and chick embryos was repated twice. Following this, virus was inoculated into chick embryo tissue cultures. Cells and fluid were harvested after 24 hours, diluted 1:100, and inoculated into a second chick embryo tissue culture. The harvest from this was passed to a third chick embryo tissue culture, and the harvest from this passage constituted the seed virus for vaccine production. The production of this seed virus is summarized in the following table; it is to be understood that, after the first passage shown, each passage of virus started from virus harvested in the preceding passage, suitably diluted. After each of the passages listed as a step in the production of seed virus, an experimental chick embryo tissue culture vaccine was prepared and evaluated in the guinea pig test. The last two columns of the table show the properties of these experimental vaccines.

Passages through chick embryo tissue culture in the preparation of seed virus were performed by the techniques described above in connection with production of virus, except that cultures intended for seed were alternately frozen and thawed and aliquots stored at −50° C. The seed virus was tested for sterility and titer, and identified as to strain purity before use.

Production of equine encephalomyelitis
(Western type) seed virus

The starting material was the strain known as the Lederle strain, which was originally isolated from a naturally infected horse and had been passed a number of times through embryonated eggs. This virus as received was diluted 1:2 with 2% glycerine in saline. It was further diluted 1:500 in buffered saline, and then 0.1 cc. was injected intracerebrally into each of 4 guinea pigs. The guinea pigs became paralyzed after 4 days; they were then sacrificed and their brain tissue was ground with an equal weight of buffered saline, after which the suspension was centrifuged at 2,000 r.p.m. for 15 minutes. The supernatant liquid was diluted 1:10,000, and inoculated into 10-day embryonated eggs. After 24 hours the infected embryos were harvested, ground with 9 parts of saline, centrifuged, and diluted 1:1,000 with buffered saline; the virus was passed twice more through embryonated eggs, and the harvest from the third egg passage was used to inoculate chick embryo tissue cultured cell sheets. The harvest from this first chick embryo tissue culture passage was satisfactory as seed virus. Five further passages were made in chick embryo tissue culture, and the harvest virus from each proved satisfactory as seed virus for use in vaccine production.

The production of seed virus for production of equine encephalomyelitis virus (Western type) is summarized in the following Table II. As in the preparation of Eastern type seed virus, experimental vaccines were made at each passage stage; the properties of these test vaccines are summarized in the last two columns of the table.

TABLE I

| Passage No. | Dilution used | Amt. of inoculum (cc.) | Substrate | Titer of seed [1] | Titer [1] of chick tissue culture vaccine virus prior to inactivation | Percent protection in guinea pig potency test of vaccine produced in chick tissue culture using this seed percent |
|---|---|---|---|---|---|---|
| 1 | WRPF6 1:1,000 | 0.1 | CE | 7.2 | 6.5 | 40 |
| 2 | 1:1,000,000 | 0.2 | CE | 7.4 | 6.0 | 30 |
| 3 | 1:1,000,000 | 0.2 | CE | 7.0 | 5.5 | 20 |
| 4 | 1:1,000,000 | 0.2 | CE | 7.5 | 6.0 | 30-50 |
| 5 | 1:1,000 | 0.1 | GP | 6.0 | 5.0 | 40 |
| 6 | 1:100 | 0.2 | CE | 7.4 | 7.0 | 50 |
| 7 | 1:1,000 | 0.1 | GP | 8.0 | 6.2 | 40 |
| 8 | 1:1,000 | 0.2 | CE | 7.1 | 7.2 | 40 |
| 9 | 1:1,000 | 0.1 | GP | 7.5 | 6.0 | 60 |
| 10 | 1:1,000 | 0.2 | CE | 7.0 | 6.5 | 70 |
| 11 | 1:1,000 | 5.0 | CE TC | 6.0 | 7.0 | 60-80 |
| 12 | 1:1,000 | 5.0 | CE TC | 6.4 | 6.25 | 80 |
| 13 | 1:1,000 | 5.0 | CE TC | 6.25 | 6.5 | 90-100 |

CE=Chick embryo (10-day embryonated eggs).
GP=Guinea pig.
CE TC=Chick embryo tissue culture.
[1] Titer=$\log_{10}LD_{50}$ (mouse)/0.03 ml.

TABLE II

| Passage No. | Dilution used | Amt. of inoculum (cc.) | Substrate | Titer of seed [1] | Titer [1] of chick tissue culture vaccine virus prior to inactivation | Percent protection in guinea pig potency test of vaccine produced in chick tissue culture using this seed, percent |
|---|---|---|---|---|---|---|
| 1 | 1:1,000 Lederle WEE | 0.1 | GP | 7.0 | 5.0 | 50 |
| 2 | 1:20,000 | 0.2 | CE | 5.5 | 4.6 | 70 |
| 3 | 1:10,000 | 0.2 | CE | 5.5 | 5.5 | 60 |
| 4 | 1:10,000 | 0.2 | CE | 5.0 | 5.25 | 70 |
| 5 | 1:1,000 | 1.0 | CE TC | 6.37 | 5.5 | 90 |
| 6 | 1:1,000 | 5.0 | CE TC | 6.0 | 6.5 | 90 |
| 7 | 1:1,000 | 5.0 | CE TC | 5.38 | 6.5 | 80 |
| 8 | 1:1,000 | 5.0 | CE TC | 5.4 | 6.0 | 100 |
| 9 | 1:1,000 | 5.0 | CE TC | 5.6 | 6.25 | 90-100 |

CE=Chick embryos (10-day embryonated eggs)
GP=Guinea pig
CE TC=Chick embryo tissue culture
[1] Titer=$\log_{10}LD_{50}$ (mouse)/0.03 ml.

Preparation of growth and maintenance media

Earle's balanced salt solution containing 0.5% lactalbumin hydrolysate is prepared in conformity with the following formula:

| | |
|---|---|
| Sodium chloride (NaCl) g | 6.8 |
| Potassium chloride (KCl) | 0.4 |
| Magnesium sulfate ($MgSO_4 \cdot 7H_2O$) | 0.205 |
| Monosodium phosphate ($NaH_2PO_4$) | 0.114 |
| Glucose | 1.000 |
| Lactalbumin hydrolysate | 5.000 |
| Water to make ml | 1,000 |

To prepare growth medium, antibiotics are added to the above to give concentrations of 200μ, 200 mcgm., and 2 mcgm. per ml. of penicillin G, dihydrostreptomycin, and amphotericin B, respectively. Then, to 26,160 ml. of this antibiotics-containing balanced salt solution there is added 600 ml. of calf serum and 240 ml. of 10% sodium bicarbonate solution, bringing the pH to 7.2.

Preparation of cells

One hundred twenty-five 11-day chick embryos are collected aseptically. The heads are removed and the bodies minced into pieces 2 mm. or smaller in size, washed thoroughly in phosphate buffered saline solution, and trypsinized. The trypsin-dispersed cell suspension is strained through cheese cloth, and centrifuged at 1,000 r.p.m. for 10 minutes. The cells are washed once with growth medium and then suspended in growth medium at a concentration of 3 ml. of packed cells per liter. Three hundred ml. of this cell suspension is introduced into each of a number of 4 liter vitex bottles. These cultures are maintained at 37° C. for 24 hours, by the end of which time the wetted portion of the bottle interior is covered by a uniform sheet of cells.

Infection of cell cultures

After the above-described production of a uniform sheet of chick-embryo tissue culture cells, the spent growth medium is poured off, and the cell sheet is overlaid with 5 ml. of a 1:1,000 dilution of the equine encephalomyelitis (Eastern type) seed virus in phosphate buffered saline. The virus is allowed to absorb for 30 minutes at 37° C. The flasks are then refilled to their original level and maintenance medium consisting of Parker's medium No. 199 to which had been added antibiotics in the same concentration as used in the growth medium, 0.5% lactalbumin hydrolysate, and enough 10% sodium bicarbonate to adjust the pH to 7.2 (about 0.2% by volume).

Virus growth and harvest

The virus-infected cultures are again maintained at 37° C. for 24 hours and examined macroscopically for absence of contamination and microscopically for the cytopathogenic effect characteristically associated with encephalomyelitis virus multiplication. There should be no signs of bacterial contamination but cytopathogenic effects will be evident. The flasks are shaken to remove adhering cells, and the cells and fluid aseptically siphoned off and stored in the cold at 4° C. The liquid was found to be sterile and to have a virus titer of $10^{7.5}$ $LD_{50}/0.03$ cc. (mouse).

Inactivation and preservation

To 30,000 ml. of virus-containing fluid there was added 150 ml. of a 1:10 dilution of formalin and 60 ml. of a 10% solution of merthiolate. The solution was then held at 25° C. for 96 hours and then at 4° C. for an additional 240 hours. Thereafter test samples were removed and the bulk of the material was frozen for storage until further processing. Satisfactory inactivation was shown by injecting 0.03 ml. intracerebrally into 15–18 gram mice. The mice remained free of encephalitis symptoms for 10 days.

Production of equine encephalomyelitis virus (Western type)

This preparation was carried out as described above for the Eastern type except that the cell sheets were infected by overlaying with 5 cc. of a 1:100 dilution of seed virus. The stock virus was found to have a titer of $10^{6.6}$ $LD_{50}/0.03$ cc. (mouse). Stock solution was treated with formalin and merthiolate as described for the Eastern type.

Preparation of bivalent vaccine

Thirty liters of formalin inactivated stock virus of each of the two types (Eastern and Western) were strained through a 100-mesh nylon bag and thoroughly mixed. The resulting liquid was suitable as a bivalent vaccine for protecting horses against both Eastern and Western types of equine encephalomyelitis. If the vaccine is to be used at once it can be diluted with buffered saline or with maintenance medium to reduce the virus titers to about $10^{5.2}$ (Eastern) and about $10^{4.3}$ (Western) and still be effective; however, if storage for an extended time is contemplated, it will be preferable to dilute it less or not at all. The recommended field dosage is two 1 cc. doses given intradermally at an interval of 7–14 days.

Testing of bivalent vaccine for safety and potency

Safety.—Two guinea pigs are injected intracerebrally with 0.1 ml. of bivalent vaccine, and observed for ten days. The animals remain normal for this period, indicating safety of the vaccine.

Potency.—Twenty guinea pigs were each inoculated subcutaneously with two 0.5 ml. doses of bivalent vaccine with seven days between injections. Ten days after the second dose, ten of these pigs and 4 control animals were challenged intracerebrally with 0.1 ml. of a virulent Eastern type challenge virus of a strain different from that used as seed virus. In like manner, 10 vaccinated pigs and 4 controls were challenged intracerebrally with 0.1 ml. of a Western type challenge virus of a strain different from the seed virus used for production of the vaccine. In each case, all vaccinated pigs survived challenge for 10 days, and all controls succumbed, with typical encephalomyelitis symptoms, within 10 days.

The above test demonstrated the potency of the bivalent vaccine.

Additionally, the vaccine was tested on a group of 13 horses, using the Hemagglutination Inhibition titer as a measure or indication of the development or presence of serum antibodies. The results are summarized in the following tables.

TABLE III.—EASTERN EQUINE ENCEPHALOMYELITIS HEMAGGLUTINATION INHIBITION TITERS OF HORSES RECEIVING BIVALENT VACCINE

| Horse No. | Pre-vac. | 19 days after 1st dose | 2nd dose 42 days after 1st dose | 2 weeks after 2nd dose | 4 weeks after 2nd dose |
|---|---|---|---|---|---|
| 1 | <1:10 | <1:10 | <1:10 | 1:20 | 1:80 |
| 2 | <1:10 | <1:10 | <1:10 | 1:20 | 1:40 |
| 4 | <1:10 | <1:10 | <1:10 | 1:10 | 1:40 |
| 5 | <1:10 | <1:10 | <1:10 | <1:10 | <1:10 |
| 6 | <1:10 | <1:10 | <1:10 | <1:10 | <1:10 |
| 9 | <1:10 | <1:10 | <1:10 | <1:10 | <1:10 |
| 19 | <1:10 | <1:10 | <1:10 | No sera | 1:10 |
| 21 | <1:10 | <1:10 | <1:10 | 1:20 | 1:20 |
| 22 | <1:10 | <1:10 | <1:10 | 1:20 | 1:40 |
| 27 | <1:10 | <1:10 | <1:10 | 1:10 | 1:40 |
| 29 | <1:10 | 1:20 | 1:10 | 1:80 | 1:160 |
| 33 | <1:10 | 1:20 | <1:10 | 1:40 | 1:40 |
| 34 | <1:10 | 1:20 | 1:40 | 1:80 | 1:40 |
| GMT* | <1:10 | 1:2 | 1:1.6 | 1:11.3 | 1:17.1 |

*Geometric mean titer.

TABLE IV.—WESTERN EQUINE ENCEPHALOMYELITIS HEMAGGLUTINATION INHIBITION TITERS OF HORSES RECEIVING BIVALENT VACCINE

| Horse No. | Pre-vac. | 19 days after 1st dose | 2nd dose 42 days after 1st dose | 14 days after 2nd dose | 28 days after 2nd dose |
|---|---|---|---|---|---|
| 1 | <1:10 | 1:10 | 1:20 | 1:20 | 1:40 |
| 2 | <1:10 | <1:10 | 1:20 | 1:80 | 1:160 |
| 4 | <1:10 | 1:20 | 1:40 | 1:160 | 1:320 |
| 5 | <1:10 | <1:10 | <1:10 | 1:80 | 1:160 |
| 6 | <1:10 | <1:10 | <1:10 | <1:10 | <1:10 |
| 9 | <1:10 | 1:20 | 1:20 | 1:160 | 1:80 |
| 19 | 1:10 | 1:40 | 1:40 | No sera | 1:80 |
| 21 | <1:10 | 1:80 | 1:80 | 1:160 | 1:160 |
| 22 | <1:10 | 1:20 | 1:40 | 1:160 | 1:320 |
| 27 | <1:10 | 1:20 | 1:40 | 1:160 | 1:320 |
| 29 | <1:10 | 1:80 | 1:40 | 1:320 | 1:320 |
| 33 | <1:10 | 1:40 | 1:20 | 1:160 | 1:160 |
| 34 | <1:10 | 1:40 | 1:20 | 1:80 | 1:160 |
| GMT* | <1:10 | 1:14 | 1:18 | 1:78 | 1:108 |

*Geometric mean titer.

What is claimed is:

1. A method of producing a seed virus suitable for use in production of a killed tissue-culture origin virus vaccine capable of stimulating production in a mammal of immunizing anti-bodies protective against a virulent virus of the group consisting of Eastern and Western types of equine encephalomyelitis which comprises subjecting an egg-adapted strain of virulent virus from the group consisting of Eastern and Western types of equine encephalomyelitis to at least one intracerebrally inoculated guinea pig brain passage and at least three embryonated egg passages, each guinea pig brain passage preceding and following an embryonated egg passage, and thereafter passing the so-conditioned virus through at least one in vitro tissue cultured culture of cells derived from chick embryos, and thereafter recovering a suspension of seed virus.

2. A method according to claim 1 in which an egg-adapted strain of a virulent Eastern equine encephalomyelitis virus is passaged three times each through brains of guinea pigs and through embryonated eggs, the said egg and brain passages alternating with each other, and thence at least three times through in vitro tissue cultures of cells derived from chick embryos.

3. A method according to claim 1 in which an egg-adapted virulent strain of Western equine encephalomyelitis virus is inoculated intracerebrally into a guinea pig, thereby causing said guinea pig to develop typical encephalomyelitis symptoms, and in which virus recovered from the brain of said guinea pig is passaged at least three times through embryonated eggs and thereafter at least once through an in vitro tissue culture of cells derived from chick embryos.

4. A method of producing a vaccine capable of stimulating the production in a mammal of protective anti-bodies against a virus of the group consisting of Eastern equine encephalomyelitis and Western equine encephalomyelitis which comprises the steps of preparing a seed virus by the process of claim 1, inoculating said seed virus onto a drained and rinsed confluent sheet of in vitro cultured cells derived from chick embryos and grown in a serum-containing nutrient medium capable of supporting the in vitro growth of such cells, flooding the so inoculated sheet of confluent tissue-cultured chick embryo cells with a serum-free nutrient medium, incubating the so inoculated and so flooded cell sheet at about 37° C. for a period of about 24 hours, determining the number of mouse median lethal doses per unit volume in the so incubated fluid, adding to said fluid, sufficient formalin to give a final formalin concentration of about 0.05%, maintaining the formalin-treated fluid at about 25° C. for 96 hours and thereafter at 4° C. for at least 240 hours, and thereafter packaging said killed virus vaccine to contain at least two guinea pig protective doses per dosage unit.

5. A method according to claim 4 in which the seed virus is an egg-adapted strain of virulent Eastern equine encephalomyelitis virus conditioned by passaging three times each through intracerebrally inoculated guinea pig brains and embryonated eggs, the said passages alternating with each other, and thence at least three times through in vitro tissue cultures of cells derived from chick embryos.

6. A method according to claim 4 in which the seed virus is an egg-adapted strain of virulent Western equine encephalomyelitis conditioned by intracerebrally inoculated passage through a guinea pig brain followed by at least three passages through embryonated eggs and at least once thereafter through an in vitro tissue culture of cells derived from chick embryos.

7. A method according to claim 4 whereby a bivalent vaccine capable of stimulating in a mammal the production of immunizing anti bodies protective against both Eastern and Western types of equine encephalomyelitis is produced, wherein monovalent vaccines protective, respectively, against Eastern and Western equine encephalomyelitis are separately produced according to the process of claim 4, and thereafter combined in such ratio as to result in a vaccine containing two guinea pig protective doses of each inactivated virus in each dosage amount.

8. A bivalent vaccine produced by the process of claim 7.

9. A vaccine produced by the process of claim 5.

10. A vaccine produced by the process of claim 6.

References Cited

UNITED STATES PATENTS 2,204,064  6/1940  Beard _____ 167—78

OTHER REFERENCES

Berge, T. O. et al., Amer. J. Hyg. 73: 209–218 (1961) "Attenuation of Venezuelan Equine Encephalomyelitis Virus by in Vitro Cultivation in Guinea-Pig Heart Cells."

Henderson, J. R., J. Immunol. 93: 452–461 (1964), "Immunologic Characterization of Western Equine Encephalomyelitis Virus Strains."

Gutekunst, D. E. et al., Vet. Med. Small Anim. Uin. 61: 348–351 (1966), "Immunization Against Equine Encephalomyelitis With a New Tissue Culture Origin Vaccine."

Roca-Garcia, M. et al., Proc. 68th Ann. Meet. U.S. Livestock Sanit. Asso.: (1964), "An Attenuated Strain of Western Equine Encephalitis Virus as a Possible Live Immunizing Agent."

LEWIS GOTTS, Primary Examiner.

S. K. ROSE, Assistant Examiner.

U.S. Cl. X.R.

195—1.3, 1.4